No. 677,917. Patented July 9, 1901.
E. ARNOLD, O. S. BRAGSTAD & J. L. LA COUR.
ARRANGEMENT OF NON-INDUCTIVE WINDINGS.
(Application filed Jan. 26, 1901.)
(No Model.)

UNITED STATES PATENT OFFICE.

ENGELBERT ARNOLD, OLE SIVERT BRAGSTAD, AND JENS LASSEN LA COUR, OF CARLSRUHE, GERMANY.

ARRANGEMENT OF NON-INDUCTIVE WINDINGS.

SPECIFICATION forming part of Letters Patent No. 677,917, dated July 9, 1901.

Application filed January 26, 1901. Serial No. 44,852. (No model.)

*To all whom it may concern:*

Be it known that we, ENGELBERT ARNOLD, professor, a subject of the Emperor of Germany, OLE SIVERT BRAGSTAD, a subject of the King of Sweden and Norway, and JENS LASSEN LA COUR, a subject of the King of Denmark, electrical engineers, all residing at Carlsruhe, Grand Duchy of Baden, Germany, have invented certain new and useful Improvements in the Arrangement of Non-Inductive Windings, of which the following is a specification.

The non-inductive windings hereinafter described are specially usable for systems for distribution of polycyclic current, which are described in another application entitled "A system for distribution of electric currents for independent polycyclic currents," Serial No. 41,630, filed December 31, 1900. The system of distribution for independent polycyclic currents always requires main systems with neutral points, by means of which the superposed currents can be introduced and taken off. As these neutral points in general are obtained by the installation of generators, transformers, motors, or, when necessary, by choking-coils, so the windings of these apparatus must be arranged in such a way that their self-induction with regard to the superposed current is the least possible. This object will be accomplished by the bifilar windings hereinafter described. As the superposed currents flow through all phases of the main system in the same direction, (they are of the same phase,) so it is continually needful to secure that the windings are so arranged that an even number of phases lie as close together as possible, and, further, so arranged that the superposed currents reckoned from the neutral point flow in one half of these phases in one direction and in the other in the opposite direction. By such an arrangement the magnetizing force of the superposed currents in such a part of the windings is practically null, (0,) and therefore the self-induction of the winding is in regard to the superposed current negligible.

Figure 1:
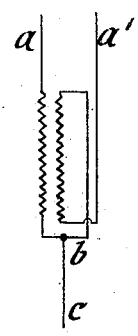

Figure 1 exhibits the employment of this arrangement on a two-phase choking-coil. As the superposed current must be taken off from the middle of the winding of this coil (from the neutral point) the two halves of such winding must be wound parallel on the core, but in an opposite direction, as reckoned from the neutral point, so that the induced electromotive forces of the main current are added, while those of the superposed currents reciprocally neutralize each other. $a$ and $a'$ are the supply-conductors, $b$ the neutral point, and $c$ the conductor by which the superposed current is taken off.

Figure 2:
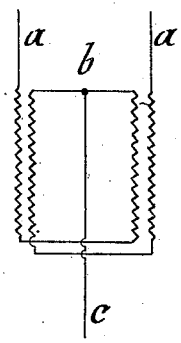

Fig. 2 shows the same arrangement, but for two-core choking-coils.

Figure 3:
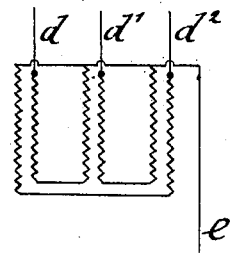

Fig. 3 gives an analogous arrangement for a three-phase current. On the core 1 phases 1 and 3 are wound in opposite direction, on core 2 in the same way phases 2 and 1 are wound, and on core 3 in the same way the phases 3 and 2 are wound. $d$, $d'$, and $d^2$ are the supply-conductors, while $a$ is the conductor for taking off the superposed current.

Figure 4:
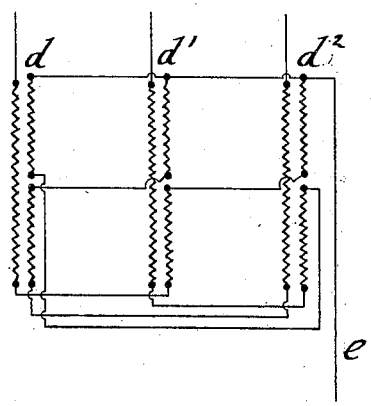

Fig. 4 shows a similar arrangement, but with the modification that one-half of one phase is divided into two parts, each of which parts is placed on one core. These choking-coils can be employed in the secondary networks of a system of distribution for polycyclic independent currents to take off the superposed current—for example, for illumination. If high tension occurs between the parallel-wound wires of the same core, the winding must be set up in coils separated and isolated one from the other, whereby the self-induction is only partially obviated.

If secondary windings are placed on the choking-coils represented by Figs. 1 to 4, these windings can be used for taking off the transformed main current.

Figure 5:
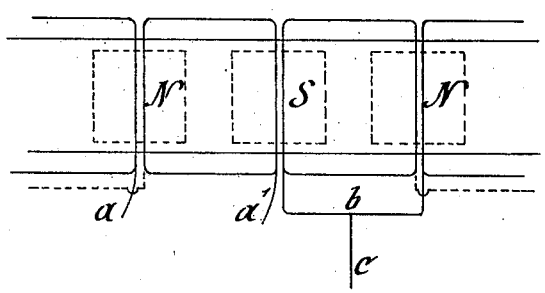

Fig. 5 represents the winding of a single-phase motor or a single-phase generator with the least possible self-induction for the superposed current. The winding consists of two halves displaced one hundred and eighty degrees with relation to each other, and are so connected that the induced electromotive forces are added and the magnetizing force of the superposed current vanishes, while two sides of different coils lie in the same slot, through which sides the same current flows in opposite directions.

Figure 6:
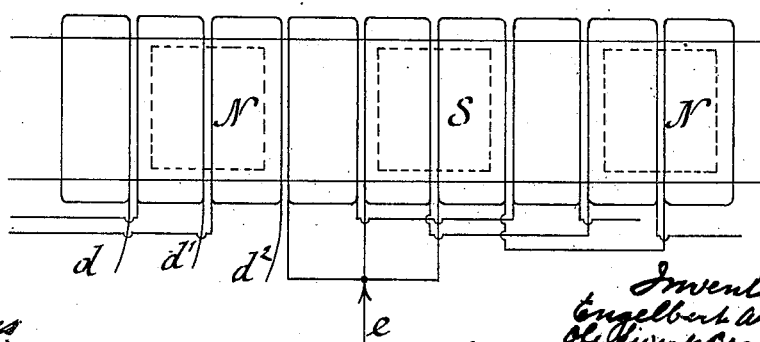

Fig. 6 gives the analogous arrangement for three-phase motors and three-phase generators. Such windings are named "uncrossed" windings. The width of the coil is $\frac{2}{x}$ times the distance between the centers of two poles, wherein $x$ denotes the number of phases.

What we claim as our invention, and desire to secure by Letters Patent of the United States, is—

An arrangement of a bifilar winding for generators, motors, transformers, and choking-coils of an $x$-phase system for lessening the self-induction of an alternating current which is superposed on such $x$-phase system, which arrangement is distinguishable herein that through two wires or coils wound side by side the superposed current flows in opposite directions and the main currents flow with such a displacement of phases as is determined by the angle of displacement of the two phases of the $x$-phase system to which the two wires or coils belong.

In testimony whereof we have signed our names to this specification in the presence of two subscribing witnesses.

ENGELBERT ARNOLD.
OLE SIVERT BRAGSTAD.
JENS LASSEN LA COUR.

Witnesses:
JACOB ADRIAN,
H. W. HARRIS.